US009122402B2

(12) United States Patent
Gantman et al.

(10) Patent No.: US 9,122,402 B2
(45) Date of Patent: Sep. 1, 2015

(54) INCREASING EFFICIENCY OF BLOCK-LEVEL PROCESSES USING DATA RELOCATION AWARENESS

(71) Applicant: International Business Machines Corporation, Armonk, NY (US)

(72) Inventors: Alex Gantman, Yokneam (IL); Eli Shahaf, Haifa (IL); Eran Raichstein, Yokneam Ilit (IL); Asaf Yeger, Kiryat-Tivon (IL)

(73) Assignee: International Business Machines Corporation, Armonk, NY (US)

( * ) Notice: Subject to any disclaimer, the term of this patent is extended or adjusted under 35 U.S.C. 154(b) by 314 days.

(21) Appl. No.: 13/735,151

(22) Filed: Jan. 7, 2013

(65) Prior Publication Data
US 2014/0195759 A1     Jul. 10, 2014

(51) Int. Cl.
*G06F 12/00*     (2006.01)
*G06F 3/06*     (2006.01)

(52) U.S. Cl.
CPC .............. *G06F 3/061* (2013.01); *G06F 3/067* (2013.01); *G06F 3/0608* (2013.01); *G06F 3/0641* (2013.01); *G06F 3/0659* (2013.01)

(58) Field of Classification Search
USPC .......................................... 711/154, 165, 170
See application file for complete search history.

(56) References Cited

U.S. PATENT DOCUMENTS

| | | | |
|---|---|---|---|
| 7,200,771 B2 * | 4/2007 | Bolt et al. ................... | 714/6.13 |
| 7,734,887 B1 | 6/2010 | Stringham | |
| 7,831,789 B1 | 11/2010 | Per et al. | |
| 2007/0192550 A1 * | 8/2007 | Rodeheffer et al. .......... | 711/154 |
| 2008/0244163 A1 * | 10/2008 | Ma et al. ...................... | 711/103 |
| 2011/0078118 A1 | 3/2011 | Kushwah | |

OTHER PUBLICATIONS

Mackenzie-Low, Bruce, "Understanding the Windows Disk Storage Architecture", http://www.petri.co.il/windows-storage-disk-architecture.htm, Mar. 24, 2011, 3 pages.

* cited by examiner

*Primary Examiner* — Matthew Bradley
(74) *Attorney, Agent, or Firm* — Francis Lammes; Stephen J. Walder, Jr.; Feb R. Cabrasawan (57) ABSTRACT

A mechanism is provided for increasing the efficiency of block-level processes. Responsive to detecting an I/O write to a storage volume, a determination is made as to whether the I/O write matches one or more suspicious I/O reads in a plurality of suspicious I/O reads previously recorded in a memory. Responsive to the I/O write matching one or more suspicious I/O reads in the plurality of suspicious I/O reads, an identification is made that there is a data relocation associated with the sector associated with the I/O write. A data relocation application is informed of the data relocation of the sector associated with the one or more suspicious I/O reads associated with the sector indicated by the I/O write. Each sector associated with the one or more suspicious I/O reads is then released in a file system for reuse.

20 Claims, 6 Drawing Sheets

INCREASING EFFICIENCY OF BLOCK-LEVEL PROCESSES USING DATA RELOCATION AWARENESS

BACKGROUND

The present application relates generally to an improved data processing apparatus and method and more specifically to mechanisms for increasing the efficiency of block-level processes using data relocation awareness.

During a data relocation process on a storage volume, despite the fact that no new data is written to the storage volume, block-level processes are unable to distinguish between a relocation of data and a new data receipt. Thus, there is a considerable consumption of resources during the block-level processes such as: additional network transportation, additional backup storage space, additional central processing unit (CPU) resources and computation time, higher I/O consumption, etc.

SUMMARY

In one illustrative embodiment, a method, in a data processing system, is provided for increasing the efficiency of block-level processes. The illustrative embodiment determines whether the I/O write matches one or more suspicious I/O reads in a plurality of suspicious I/O reads previously recorded in a memory in response to detecting an I/O write to a storage volume. The illustrative embodiment identifies that there is a data relocation associated with the sector associated with the I/O write in response to the I/O write matching one or more suspicious I/O reads in the plurality of suspicious I/O reads. The illustrative embodiment informs a data relocation application of the data relocation of the sector associated with the one or more suspicious I/O reads associated with the sector indicated by the I/O write. The illustrative embodiment then releases each sector associated with the one or more suspicious I/O reads in a file system for reuse.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for increasing the efficiency of block-level processes using data relocation awareness. The mechanism identifies data relocations over the same storage volume, which is a case where a corresponded sector or sequential numbers of sectors change their location without any changes to the file content of the storage volume, which is in contrast to new writes to the storage volume that actually change the content of files. The mechanism sends new metadata of an already existing sector, with respect to a previous block-level process of the storage volume, to the backup server. By providing such metadata, any subsequent block-level process may avoid duplicated data processing, which, after data relocations, is more efficient and saves considerable resources.

Figure 1:
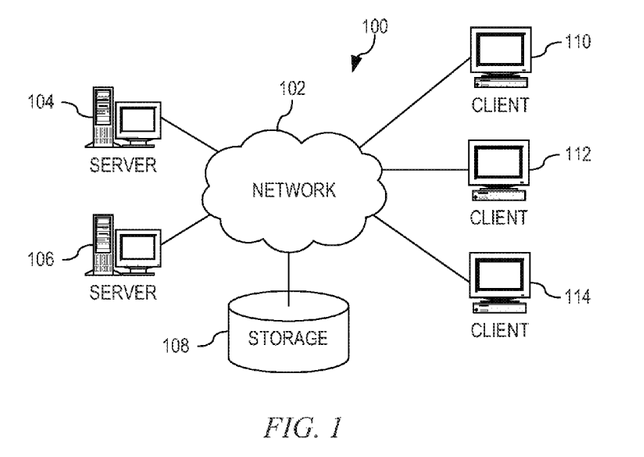
FIG. 1 is an example diagram of a distributed data processing system in which aspects of the illustrative embodiments may be implemented.
Figure 2:
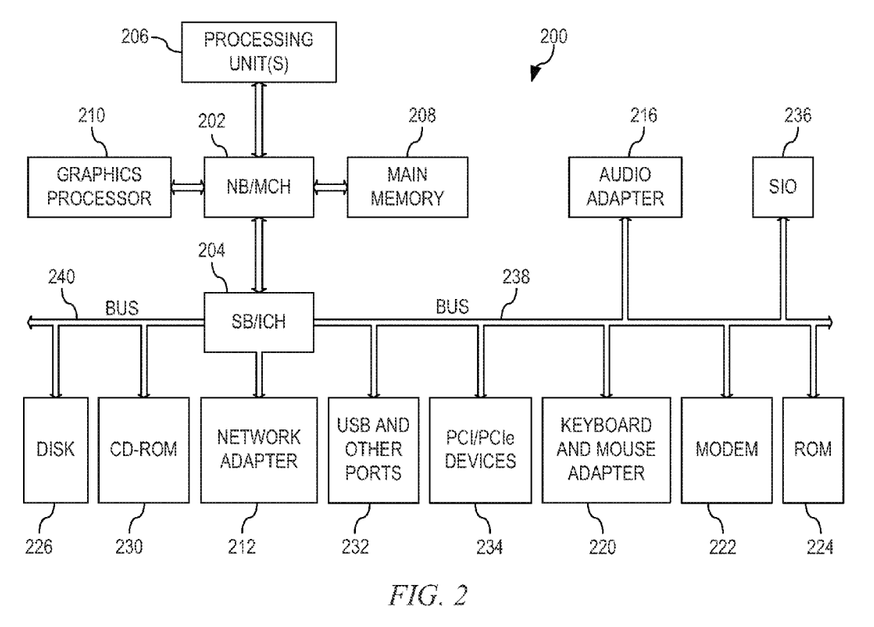
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices or volumes, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
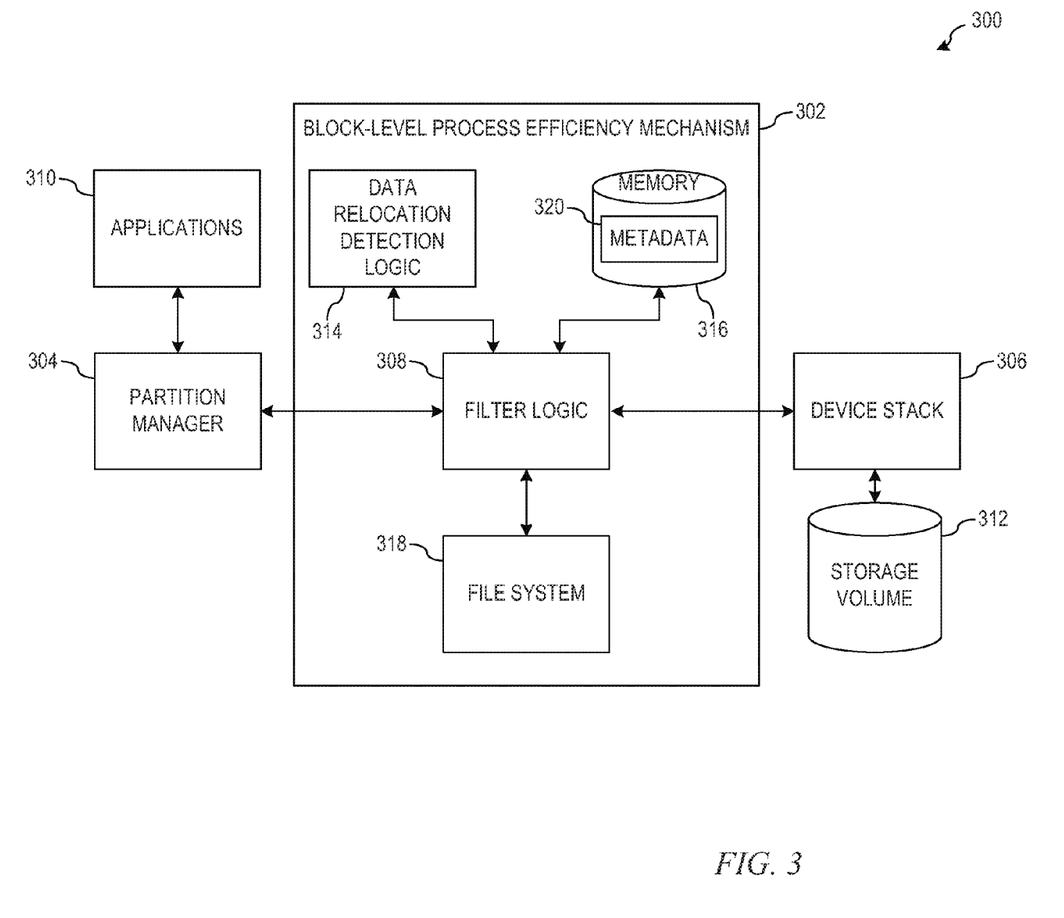
FIG. 3 depicts a functional block diagram of a mechanism that increases the efficiency of block-level processes in accordance with an illustrative embodiment.

FIG. 3 depicts a functional block diagram of a mechanism that increases the efficiency of block-level processes in accordance with an illustrative embodiment. Data processing system 300 comprises block-level process efficiency mechanism 302, which resides between partition manager 304 and device stack 306. More specifically, filter logic 308 of block-level process efficiency mechanism 302 is coupled between partition manager 304 and device stack 306. Filter logic 308 is coupled in this manner in order to identify every input/output (I/O) read and write that is issued by applications 310 to storage volume 312. In accordance with a block-level process, block-level process efficiency mechanism 302 not only detects the areas of storage volume 312 that are being relocated but, in response to a file that is being relocated also being written to during the relocation, block-level process efficiency mechanism 302 also identifies the newly written area of the file. That is, block-level process efficiency mechanism 302 identifies where a defragmentation process relocates the initial area of the file as well as the newly written area of the file that was not part of the defragmentation process. Block-level process efficiency mechanism 302 performs this process so that the areas that are being relocated will not be backed up again, while the areas that are being written will be recognized as suspicious, thus being identified as new, and will be backed up later.

With block-level process efficiency mechanism 302 being located between partition manager 304 and device stack 306, when a data relocation process, such as one of applications 310 and may be a defragmentation process, is initiated, data relocation detection logic 314 identifies a process id or system data relocation notification event associated with data relocation application 310 as captured by filter logic 308. Upon detection of the process id or system data relocation notification event, data relocation detection logic 314 signals filter logic 308 to start monitoring for suspicious I/O read operations that are not indicated, as per file system 318, as being available to be read. That is, if an I/O read is attempted on a sector in storage volume 312 and file system 318 has a record indicating that the sector is available to be read, then the I/O read is not suspicious. However, if an I/O read is attempted on a sector in storage volume 312 and file system 318 has no record indicating that the sector is available to be read, then the I/O read is suspicious. Thus, in accordance with the illustrative embodiments, suspicious I/Os are read I/Os associated with suspicious read processes that will later be determined to possibly be associated with write I/Os.

Thus, once data relocation detection logic 314 detects a data relocation process by data relocation application 310 and filter logic 308 is actively monitoring for suspicious I/Os against the storage volume where the data relocation is in progress, data relocation application 310 allocates a portion of memory 316 for the read of sector x on storage volume 312. Data relocation application 310 then requests an I/O read of sector x on storage volume 312. Filter logic 308 detects the I/O read and queries file system 318 for an open handle on the sector x that is being read, while device stack 306 completes the I/O read. An open handle indicates that the sector x is available to be read as per the file properties from file system 318.

If filter logic 308 determines that file system 318 indicates that there is an open handle, then filter logic 308 discontinues any operations with regard to the current I/O read assumed to be a common file system level operation to file system 318. However, if filter logic 308 determines that file system 318 indicates that there is no open handle, then, upon completion of the I/O read, filter logic 308 records the I/O read along with an offset in storage volume 312, a file name of the file that was read, and a file last access. The offset in storage volume 312 is a field captured directly from the read sector request. The file name is a field retrieved by filter logic 308 using a file system (FS) query to file system 318 on which the request was initiated. The FS query performed by filter logic 308 will be to find the relevant file that contains the read sector. In the event that the FS query returns a "not applicable" (N/A) because the file is a metadata sector, then filter logic 308 identifies the I/O read as not a suspicious I/O and discontinues any operations with regard to the current I/O read. The file last access is a field that is also retrieved using a FS query to file system 318 that comprises the read sector and indicates the date/time of the last access of the file. If filter logic 308 successfully identifies the offset in storage volume 312, the file name and the file last access fields, then filter logic 308 records in metadata 320 within memory 316 the I/O read, the offset in storage volume 312, the file name, and the file last access fields. While the illustrative embodiments mention filter logic 308 recording the offset, the file name, and the file last access in metadata 320, one of ordinary skill in the art will recognize that filter logic 308 as well as other components within data processing system 300, such as data relocation detection logic 314, file system 318, or the like, may record other information in metadata 320, such as file identifiers, creation dates, deletion dates, or the like, without departing from the spirit and scope of the invention.

When an I/O write of sector y is requested by data relocation application 310, filter logic 308 records the I/O write in metadata 320. Filter logic 308 then determines whether the sector y associated with the I/O write matches any sector of the suspicious I/O reads recorded in metadata 320. The match may be a full binary compare of all bytes recorded from sector of the suspicious I/O reads to all bytes from the I/O write. If filter logic 308 determines that the sector y does not match any of the sectors of suspicious I/O reads recorded in metadata 320, then the I/O write is allowed to occur normally. If filter logic 308 determines that the sector y matches a sector of a suspicious I/O read recorded in metadata 320, then filter logic 308 determines whether the file name associated with the I/O write has a same file name as any of the suspicious I/O reads recorded in metadata 320. If filter logic 308 determines that the file name associated with the I/O write fails to have a same file name as any of the suspicious I/O reads recorded in metadata 320, then the I/O write is allowed to occur normally. If filter logic 308 determines that the file name associated with the I/O write has a same file name as any of the suspicious I/O reads recorded in metadata 320, then filter logic 308 determines whether the access time associated with the I/O write matches any of the file access times of the suspicious I/O reads recorded in metadata 320. If filter logic 308 determines that the access time associated with the I/O write fails to have a matching file access time as any of the suspicious I/O reads recorded in metadata 320, then the I/O write is allowed to occur normally. That is, file system 318 retains three time stamps for each file, an access time stamp, a write time stamp, and a modify time stamp. Therefore, if any of the access time stamp, the write time stamp, or the modify time stamp of the current I/O write are different from those associated with the suspicious I/O reads recorded in metadata 320, then the I/O write is not suspicious because file system 318 is making a modification to the file, meaning that the I/O write is simply not being relocated.

If filter logic 308 determines that the access time associated with the I/O write has a matching file access time as any of the suspicious I/O reads recorded in metadata 320, then filter logic 308 identifies that there was a data relocation associated with the sector y that is being written. Filter logic 308 then informs the data relocation application 310 of the relocation operation of sector x indicated by the I/O read to sector y indicated by the I/O write. Filter logic 308 then releases the original sector x in file system 318 for reuse so that sector x is not relocated in a later data relocation process. The I/O write is then allowed to occur normally.

Figure 4A:
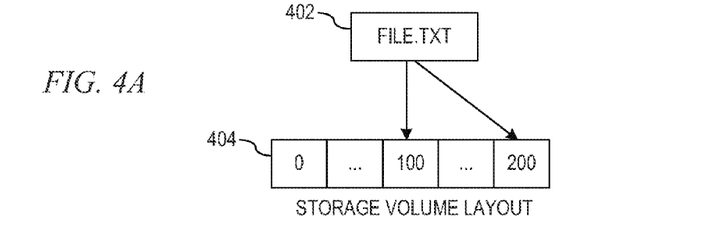
FIGS. 4A-4E illustrate a block-level process both with and without the benefits provided by block-level process efficiency mechanism in accordance with an illustrative embodiment.
Figure 4B:
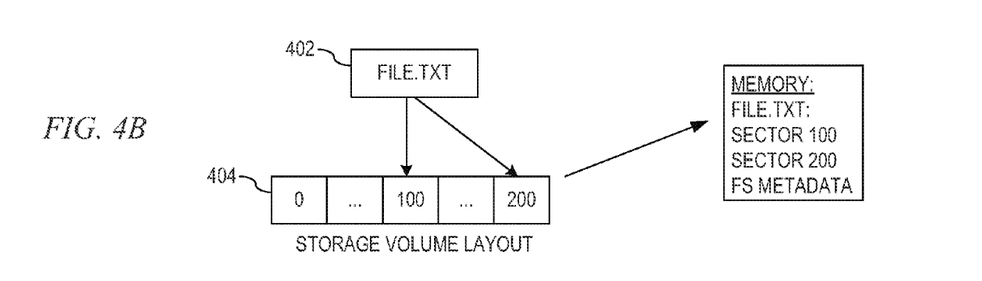
Figure 4C:
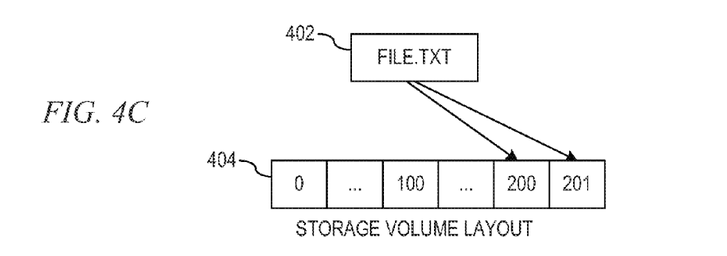
Figure 4D:
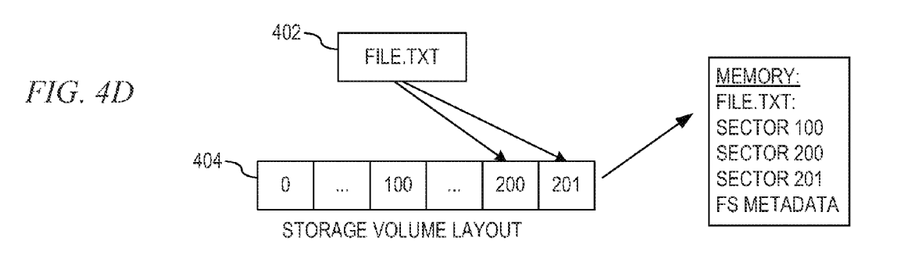
Figure 4E:
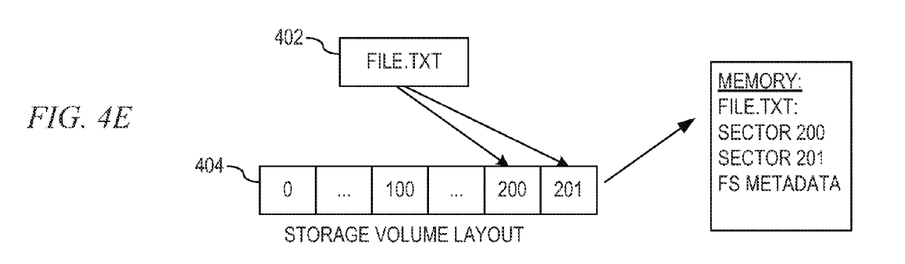

FIGS. 4A-4E illustrate a block-level process both with and without the benefits provided by block-level process efficiency mechanism in accordance with an illustrative embodiment. FIG. 4A depicts file 402 that is separately located both in sector 100 and sector 200 within storage volume 404. FIG. 4B depicts a block-level process performed prior to a data move process, where metadata within a memory records that file 402 is separately located in sectors 100 and 200 within storage volume 404. FIG. 4C depicts a data relocation process where file 402 is relocated to jointly located sectors 200 and 201 within storage volume 404. FIG. 4D depicts a block-level process performed after a data relocation process but without the benefits provided by the block-level process efficiency mechanism of the illustrative embodiments, where metadata within a memory records that file 402 is separately located in sectors 100, 200, and 201 within storage volume 404 because sector 100 was not properly released. FIG. 4E depicts a block-level process performed after a data relocation process with the benefits provided by the block-level process efficiency mechanism of the illustrative embodiments, where metadata within a memory records that file 402 is jointly located only in sectors 200 and 201 within storage volume 404 because sector 100 was properly released.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 5:
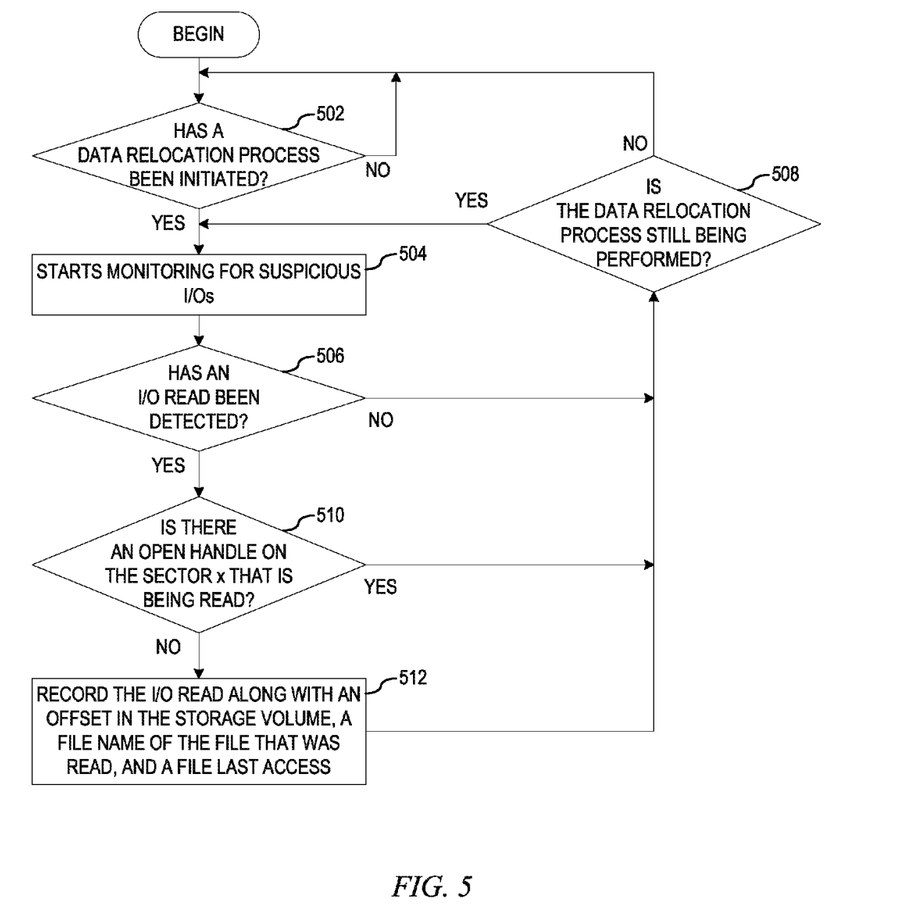
FIG. 5 depicts the operation performed by block-level process efficiency mechanism of an I/O read during a data relocation process in accordance with an illustrative embodiment.

FIG. 5 depicts the operation performed by block-level process efficiency mechanism of an I/O read during a data relocation process in accordance with an illustrative embodiment. As the operation begins, the block-level process efficiency mechanism determines whether a data relocation process has been initiated (step 502). If at step 502 the block-level process efficiency mechanism fails to detect a data relocation process, then the operation returns to step 502. If at step 502 the block-level process efficiency mechanism detects a data relocation process, then the block-level process efficiency mechanism starts monitoring for suspicious I/Os (step 504). In accordance with the illustrative embodiments, suspicious I/Os are all read I/Os associated with read processes that will later be determined to possibly be associated with write I/Os.

The block-level process efficiency mechanism then determines whether an I/O read has been detected (step 506). If at step 506 the block-level process efficiency mechanism fails to identify an I/O read, then the block-level process efficiency mechanism determines whether the data relocation process is still being performed (step 508). If at step 508 the block-level process efficiency mechanism determines that the data relocation process is no longer being performed, then the operation returns to step 502. If at step 508 the block-level process efficiency mechanism determines that the data relocation process is still being performed, then the operation returns to step 504. If at step 506 the block-level process efficiency mechanism detects an I/O read, the block-level process efficiency mechanism queries a file system to determine whether there is an open handle on the sector x that is being read (step 510).

If at step 510 the block-level process efficiency mechanism determines that there is an open handle, then the block-level process efficiency mechanism identifies the I/O read as a non-suspicious I/O read and the operation proceeds to step 508. If at step 510 the block-level process efficiency mechanism determines that there is not an open handle, then, upon completion of the I/O read, the block-level process efficiency mechanism records the I/O read along with an offset in the storage volume, a file name of the file that was read, and a file last access (step 512), with the operation proceeding to step 508 thereafter.

Figure 6:
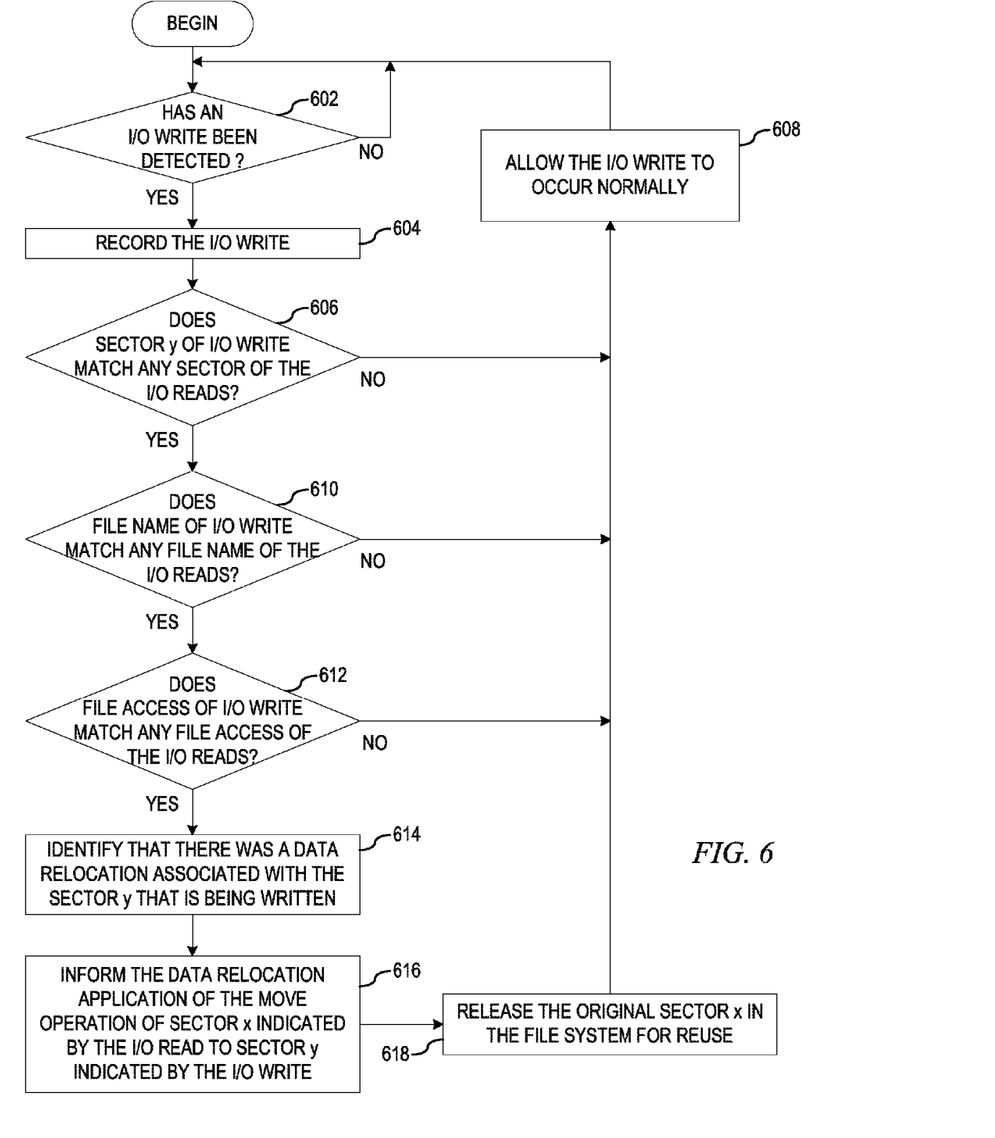
FIG. 6 depicts the operation performed by block-level process efficiency mechanism of an I/O write during a data relocation process in accordance with an illustrative embodiment.

FIG. 6 depicts the operation performed by block-level process efficiency mechanism of an I/O write during a data relocation process in accordance with an illustrative embodiment. As the operation begins, the block-level process efficiency mechanism determines whether an I/O write has been detected (step 602). If at step 602 the block-level process efficiency mechanism fails to determine that an I/O write has been detected, then the operation returns to step 602. If at step 602 the block-level process efficiency mechanism determines that an I/O write has been detected, then the block-level process efficiency mechanism records the I/O write (step 604). The block-level process efficiency mechanism then determines whether the sector y associated with the I/O write matches any sector of the suspicious I/O reads previously recorded (step 606). If at step 606 the block-level process efficiency mechanism determines that the sector y does not match any of the sectors of the suspicious I/O reads previously recorded, then the block-level process efficiency mechanism allows the I/O write to occur normally (step 608), with the returning to step 602 thereafter.

If at step 606 the block-level process efficiency mechanism determines that the sector y matches a sector of a suspicious I/O read previously recorded, then the block-level process efficiency mechanism determines whether the file name associated with the I/O write has a same file name as any of the suspicious I/O reads previously recorded (step 610). If at step 610 the block-level process efficiency mechanism determines that the file name associated with the I/O write fails to have a same file name as any of the suspicious I/O reads previously recorded, then the operation proceeds to step 608. If at step 610 the block-level process efficiency mechanism determines that the file name associated with the I/O write has a same file name as any of the suspicious I/O reads previously recorded, then the block-level process efficiency mechanism determines whether the access time associated with the I/O write matches any of the file access times as any of the suspicious I/O reads previously recorded (step 612).

If at step 612 the block-level process efficiency mechanism determines that the access time associated with the I/O write fails to have a matching file access time as any of the suspicious I/O reads previously recorded, then the operation proceeds to step 608. Is at step 612 the block-level process efficiency mechanism determines that the access time associated with the I/O write has a matching file access time as any of the suspicious I/O reads previously recorded, then the block-level process efficiency mechanism identifies that there was a data relocation associated with the sector y that is being written (step 614). The block-level process efficiency mechanism informs the data relocation application of the relocation operation of sector x indicated by the I/O read to sector y indicated by the I/O write (step 616). The block-level process efficiency mechanism then releases the original sector x in the file system for reuse so that sector x is not relocated in a later data relocation process (step 618), with the operation proceedings to step 608 thereafter.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for increasing the efficiency of block-level processes using data relocation awareness. The illustrative embodiments identify data relocations over the same storage volume, which is a case where a corresponded sector or sequential numbers of sectors change their location without any changes to the file content of the storage volume, which is in contrast to new writes to the storage volume that actually changes the content of files. The illustrative embodiments send new metadata of an already existing sector, with respect to a previous block-level process of the storage volume, to the backup server. By providing such metadata, any subsequent block-level process may avoid duplicated data processing, which, after data relocations, is more efficient and saves considerable resources.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for increasing the efficiency of block-level processes, the method comprising:
   responsive to detecting an I/O write to a storage volume, determining whether the I/O write matches one or more suspicious I/O reads in a plurality of suspicious I/O reads previously recorded in a memory, wherein each suspicious I/O read in the plurality of suspicious I/O reads is identified by a previous I/O read on a sector in the memory which has no record indicating that the sector is available to be read;
   responsive to the I/O write matching one or more suspicious I/O reads in the plurality of suspicious I/O reads, identifying that there is a data relocation associated with the sector associated with the I/O write;
   informing a data relocation application of the data relocation of the sector associated with the one or more suspicious I/O reads associated with the sector indicated by the I/O write; and
   releasing each sector associated with the one or more suspicious I/O reads in a file system for reuse.

2. The method of claim 1, further comprising:
   continuing with the I/O write operation.

3. The method of claim 1, wherein the determination of whether the I/O write matches the one or more suspicious I/O reads, further comprises:
   determining whether a sector associated with the I/O write matches a sector associated with the one or more suspicious I/O reads;
   responsive to the sector associated with the I/O write matching the sector associated with the one or more suspicious I/O reads forming a first subset of suspicious I/O reads, determining whether the file name associated with the I/O write matches a file name of one or more suspicious I/O reads in the first subset of suspicious I/O reads;
   responsive to the file name associated with the I/O write matching the file name of one or more suspicious I/O reads in the first subset of suspicious I/O reads forming a second subset of suspicious I/O reads, determining whether an access time associated with the I/O write matches a file access time of one or more suspicious I/O reads in the second subset of suspicious I/O reads; and
   responsive to the access time associated with the I/O write matching the file access time of one or more suspicious I/O reads in the second subset of suspicious I/O reads forming a third subset of suspicious I/O reads, identifying that there is a data relocation associated with the sector associated with the I/O write.

4. The method of claim 3, further comprising:
   responsive to the sector associated with the I/O write failing to match the sector associated with the one or more suspicious I/O reads forming a first subset of suspicious I/O reads, continuing with the I/O write operation;
   responsive to the file name associated with the I/O write failing to match the file name of one or more suspicious I/O reads in the first subset of suspicious I/O reads forming a second subset of suspicious I/O reads, continuing with the I/O write operation; and
   responsive to the access time associated with the I/O write failing to match the file access time of one or more suspicious I/O reads in the second subset of suspicious I/O reads forming a third subset of suspicious I/O reads, continuing with the I/O write operation.

5. The method of claim 1, wherein the plurality of suspicious I/O reads are identified by the method comprising:
   responsive to determining that a data relocation process has been initiated, determining whether an I/O read has been detected;
   responsive to an I/O read being detected, querying the file system to determine whether there is an open handle on a sector associated with the I/O read; and
   responsive to determining that there is no open handle on the sector associated with the I/O read, recording the I/O read along with an offset in the storage volume, a file name of a file read by the I/O read, and a file last access associated with the I/O read.

6. The method of claim 5, further comprising:
   responsive to determining that there is the open handle on the sector associated with the I/O read, identifying the I/O read as a non-suspicious I/O read.

7. The method of claim 5, wherein the recording of the I/O read, the offset in the storage volume, the file name of the file read by the I/O read, and the file last access associated with the I/O read is performed upon completion of the I/O read.

8. A computer program product comprising a non-transitory computer readable storage medium having a computer readable program stored therein, wherein the computer readable program, when executed on a computing device, causes the computing device to:
   responsive to detecting an I/O write to a storage volume, determine whether the I/O write matches one or more suspicious I/O reads in a plurality of suspicious I/O reads previously recorded in a memory, wherein each suspicious I/O read in the plurality of suspicious I/O reads is identified by a previous I/O read on a sector in the memory which has no record indicating that the sector is available to be read;
   responsive to the I/O write matching one or more suspicious I/O reads in the plurality of suspicious I/O reads, identify that there is a data relocation associated with the sector associated with the I/O write;
   inform a data relocation application of the data relocation of the sector associated with the one or more suspicious I/O reads associated with the sector indicated by the I/O write; and
   release each sector associated with the one or more suspicious I/O reads in a file system for reuse.

9. The computer program product of claim 8, wherein the computer readable program further causes the computing device to:
   continue with the I/O write operation.

10. The computer program product of claim 8, wherein the computer readable program to determine whether the I/O write matches the one or more suspicious I/O reads further causes the computing device to:
    determine whether a sector associated with the I/O write matches a sector associated with the one or more suspicious I/O reads;
    responsive to the sector associated with the I/O write matching the sector associated with the one or more suspicious I/O reads forming a first subset of suspicious I/O reads, determine whether the file name associated with the I/O write matches a file name of one or more suspicious I/O reads in the first subset of suspicious I/O reads;
    responsive to the file name associated with the I/O write matching the file name of one or more suspicious I/O reads in the first subset of suspicious I/O reads forming a second subset of suspicious I/O reads, determine whether an access time associated with the I/O write matches a file access time of one or more suspicious I/O reads in the second subset of suspicious I/O reads; and responsive to the access time associated with the I/O write matching the file access time of one or more suspicious I/O reads in the second subset of suspicious I/O reads forming a third subset of suspicious I/O reads, identify that there is a data relocation associated with the sector associated with the I/O write.

11. The computer program product of claim 10, wherein the computer readable program further causes the computing device to:

responsive to the sector associated with the I/O write failing to match the sector associated with the one or more suspicious I/O reads forming a first subset of suspicious I/O reads, continue with the I/O write operation;

responsive to the file name associated with the I/O write failing to match the file name of one or more suspicious I/O reads in the first subset of suspicious I/O reads forming a second subset of suspicious I/O reads, continue with the I/O write operation; and responsive to the access time associated with the I/O write failing to match the file access time of one or more suspicious I/O reads in the second subset of suspicious I/O reads forming a third subset of suspicious I/O reads, continue with the I/O write operation.

12. The computer program product of claim 8, wherein the plurality of suspicious I/O reads are identified by the computer readable program further causing the computing device to:

responsive to determining that a data relocation process has been initiated, determining whether an I/O read has been detected;

responsive to an I/O read being detected, querying the file system to determine whether there is an open handle on a sector associated with the I/O read; and responsive to determining that there is no open handle on the sector associated with the I/O read, recording the I/O read along with an offset in the storage volume, a file name of a file read by the I/O read, and a file last access associated with the I/O read.

13. The computer program product of claim 12, wherein the computer readable program further causes the computing device to:

responsive to determining that there is the open handle on the sector associated with the I/O read, identify the I/O read as a non-suspicious I/O read.

14. The computer program product of claim 12, wherein the recording of the I/O read, the offset in the storage volume, the file name of the file read by the I/O read, and the file last access associated with the I/O read is performed upon completion of the I/O read.

15. An apparatus, comprising:
a processor; and
a memory coupled to the processor, wherein the memory comprises instructions which, when executed by the processor, cause the processor to:

responsive to detecting an I/O write to a storage volume, determine whether the I/O write matches one or more suspicious I/O reads in a plurality of suspicious I/O reads previously recorded in a memory, wherein each suspicious I/O read in the plurality of suspicious I/O reads is identified by a previous I/O read on a sector in the memory which has no record indicating that the sector is available to be read;

responsive to the I/O write matching one or more suspicious I/O reads in the plurality of suspicious I/O reads, identify that there is a data relocation associated with the sector associated with the I/O write;

inform a data relocation application of the data relocation of the sector associated with the one or more suspicious I/O reads associated with the sector indicated by the I/O write; and release each sector associated with the one or more suspicious I/O reads in a file system for reuse.

16. The apparatus of claim 15, wherein the instructions to determine whether the I/O write matches the one or more suspicious I/O reads further cause the processor to:

determine whether a sector associated with the I/O write matches a sector associated with the one or more suspicious I/O reads;

responsive to the sector associated with the I/O write matching the sector associated with the one or more suspicious I/O reads forming a first subset of suspicious I/O reads, determine whether the file name associated with the I/O write matches a file name of one or more suspicious I/O reads in the first subset of suspicious I/O reads;

responsive to the file name associated with the I/O write matching the file name of one or more suspicious I/O reads in the first subset of suspicious I/O reads forming a second subset of suspicious I/O reads, determine whether an access time associated with the I/O write matches a file access time of one or more suspicious I/O reads in the second subset of suspicious I/O reads; and responsive to the access time associated with the I/O write matching the file access time of one or more suspicious I/O reads in the second subset of suspicious I/O reads forming a third subset of suspicious I/O reads, identify that there is a data relocation associated with the sector associated with the I/O write.

17. The apparatus of claim 16, wherein the instructions further cause the processor to:

responsive to the sector associated with the I/O write failing to match the sector associated with the one or more suspicious I/O reads forming a first subset of suspicious I/O reads, continue with the I/O write operation;

responsive to the file name associated with the I/O write failing to match the file name of one or more suspicious I/O reads in the first subset of suspicious I/O reads forming a second subset of suspicious I/O reads, continue with the I/O write operation; and responsive to the access time associated with the I/O write failing to match the file access time of one or more suspicious I/O reads in the second subset of suspicious I/O reads forming a third subset of suspicious I/O reads, continue with the I/O write operation.

18. The apparatus of claim 15, wherein the plurality of suspicious I/O reads are identified by the instructions further causing the processor to:

responsive to determining that a data relocation process has been initiated, determining whether an I/O read has been detected;

responsive to an I/O read being detected, querying the file system to determine whether there is an open handle on a sector associated with the I/O read; and responsive to determining that there is no open handle on the sector associated with the I/O read, recording the I/O read along with an offset in the storage volume, a file name of a file read by the I/O read, and a tile last access associated with the I/O read.

19. The apparatus of claim 18, wherein the instructions further cause the processor to:
   responsive to determining that there is the open handle on the sector associated with the I/O read, identify the I/O read as a non-suspicious I/O read.

20. The apparatus of claim 18, wherein the recording of the I/O read, the offset in the storage volume, the file name of the file read by the I/O read, and the file last access associated with the I/O read is performed upon completion of the I/O read.

* * * * *